US012010361B2

(12) United States Patent
Giovagnoni

(10) Patent No.: US 12,010,361 B2
(45) Date of Patent: Jun. 11, 2024

(54) SYSTEM AND METHOD OF AUTOMATIC ENRICHMENT OF INFORMATION FOR AUDIO STREAMS

(71) Applicant: RADIO DIMENSIONE SUONO—SOCIETÀ PER AZIONI, Rome (IT)

(72) Inventor: Andrea Giovagnoni, Rome (IT)

(73) Assignee: RADIO DIMENSIONE SUONO—SOCIETÀ PER AZIONI, Rome (IT)

( * ) Notice: Subject to any disclaimer, the term of this patent is extended or adjusted under 35 U.S.C. 154(b) by 0 days.

(21) Appl. No.: 17/912,826

(22) PCT Filed: Mar. 3, 2021

(86) PCT No.: PCT/IB2021/051762
§ 371 (c)(1),
(2) Date: Sep. 19, 2022

(87) PCT Pub. No.: WO2021/186274
PCT Pub. Date: Sep. 23, 2021

(65) Prior Publication Data
US 2023/0141088 A1 May 11, 2023

(30) Foreign Application Priority Data
Mar. 19, 2020 (IT) .......................... 102020000005875

(51) Int. Cl.
H04N 21/233 (2011.01)
G06F 40/40 (2020.01)
(Continued)

(52) U.S. Cl.
CPC ........... *H04N 21/233* (2013.01); *G06F 40/40* (2020.01); *H04N 21/458* (2013.01); *H04N 21/4668* (2013.01); *H04N 21/812* (2013.01)

(58) Field of Classification Search
CPC .............. H04N 21/233; H04N 21/458; H04N 21/4668; H04N 21/812; H04N 21/4828; G06F 40/40; G06F 16/738
See application file for complete search history.

(56) References Cited

U.S. PATENT DOCUMENTS 7,222,354 B1 * 5/2007 Ching ................ H04N 21/4532
725/35
2004/0025180 A1 2/2004 Begeja et al.
(Continued)

FOREIGN PATENT DOCUMENTS

WO 2013/085507 6/2013

OTHER PUBLICATIONS

International Search Report and Written Opinion of the ISA for PCT/IB2021/051762 dated May 11, 2021, 10 pages.

*Primary Examiner* — Timothy R Newlin
(74) *Attorney, Agent, or Firm* — NIXON & VANDERHYE

(57) ABSTRACT

System and method of automatic enrichment of information for audio streams including an intelligent search engine which—by means of the ID3 metadata extracted from the audio file—completes a search over unstructured data sources and produces a structured database, from which a composing audio/video software automatically produces a video stream streaming with the collected additional information.

20 Claims, 3 Drawing Sheets

(51) Int. Cl.
*H04N 21/458* (2011.01)
*H04N 21/466* (2011.01)
*H04N 21/81* (2011.01)

(56) References Cited

U.S. PATENT DOCUMENTS

| | | | |
|---|---|---|---|
| 2006/0066757 A1* | 3/2006 | Numata | H04N 21/4436 348/730 |
| 2006/0141962 A1 | 6/2006 | Forbes et al. | |
| 2008/0214236 A1 | 9/2008 | Harb | |
| 2009/0077220 A1* | 3/2009 | Svendsen | H04N 21/8113 709/224 |
| 2011/0022620 A1 | 1/2011 | Woods | |
| 2012/0177292 A1* | 7/2012 | Cheon | G06F 16/433 382/190 |
| 2012/0232681 A1 | 9/2012 | Mundy et al. | |
| 2013/0124517 A1 | 5/2013 | Bilinski et al. | |
| 2014/0085445 A1* | 3/2014 | Joao | H04N 7/18 348/61 |
| 2014/0108946 A1 | 4/2014 | Olofsson | |
| 2014/0150019 A1* | 5/2014 | Ma | H04N 21/458 725/34 |
| 2014/0169760 A1* | 6/2014 | Blumenthal | H04N 21/816 386/241 |
| 2014/0233905 A1 | 8/2014 | Billmaier et al. | |
| 2014/0325057 A1* | 10/2014 | Borawski | H04N 21/4667 709/224 |
| 2015/0205573 A1* | 7/2015 | Kaplan | G06Q 50/10 700/94 |
| 2015/0254242 A1 | 9/2015 | Cirrincione et al. | |
| 2015/0293928 A1 | 10/2015 | Chen et al. | |
| 2017/0103754 A1* | 4/2017 | Higbie | H04N 21/812 |
| 2017/0238039 A1* | 8/2017 | Sabattini | G06F 16/4387 705/14.73 |
| 2017/0272816 A1* | 9/2017 | Olds | H04N 21/458 |
| 2019/0013028 A1 | 1/2019 | Atti et al. | |

* cited by examiner

SYSTEM AND METHOD OF AUTOMATIC ENRICHMENT OF INFORMATION FOR AUDIO STREAMS

CROSS-REFERENCE TO RELATED APPLICATIONS

This application is the U.S. national phase of International Application No. PCT/IB2021/051762 filed Mar. 3, 2021 which designated the U.S. and claims priority to IT Patent Application No. 102020000005875 filed Mar. 19, 2020, the entire contents of each of which are hereby incorporated by reference.

FIELD OF THE ART

The present invention operates in the radio and television field. In particular the proposed invention regards an application based on joining different software components which—by working synergistically with each other—greatly increase the customer listening experience, ensuring that the listener is increasingly in close contact with his/her favorite radio station.

PRIOR ART

At the present state of the art, the typical software programs for creating schedules and managing contents (digital signage) do not allow automating the digital mounting process, exploiting in real time the analysis of the metadata of an audio stream (input of the system), thus automatically recovering the multimedia audiovisual contents and the contextual information in order to generate a continuous video stream (output of the system).

In addition, in the solutions present on the market, a continuous video stream (output of the system) is not transmitted, but rather HTML pages which require specific systems for operation, in particular the composition of the client-side contents, with consequent management costs and logistics and administration problems.

A further drawback, in the examined, field, regards the typical television, for which in the current situation it is necessary to provide typical television direction instruments; additionally, the videoclips relative to the broadcast songs are edited in order to ensure that the length of the video corresponds exactly to the length of the audio song broadcast on the radio, negatively affecting times and costs.

Internationally, it is possible to retrieve a certain number of patents pertaining the indicated problem, such as the United States patent US2019013028 which proposes a system for encoding multiple audio streams, or the patent WO2013085507 which describes a system for receiving and digitizing an audio stream so as to store the stream in a memory. Finally, the patent US2012232681A1 proposes a method for creating audiovisual contents starting from contents of audio type. Said patent uses a software which extracts metadata from an audio file and completes a search over a database of visual elements in order to then produce the audiovisual content. The problem that remains unresolved by this patent is that the source of data from which it draws visual contents is a list of well-structured databases, while the present invention resolves the problem of the situation in which the data is unstructured, and additionally is updated in real time. From a technical standpoint, such search is much more complex than carrying out a simple filter on a series of databases, such that in some cases the use of artificial intelligence is required.

There is no doubt, therefore, that the above prior art solutions only partly address the critical aspects set forth above.

DESCRIPTION OF THE INVENTION

According to the present invention, a system and method of automatic enrichment of information for audio streams are attained, having as objective the distribution of audio streams (typically radio) also on devices provided with screen such as televisions, tablets, smartphones, totems, etc., enriching the radio relationship of the listener with the addition of visual information (images and videos) related to the broadcast radio content. Such enrichment is carried out in a completely automatic manner and in real time by means of a dedicated search engine that collects missing or updated information on a given audio stream being played and aggregates it in an ordered manner before presenting it to the user in audio/video format.

First of all, the solution is composed of different hardware and software components which, by working synergistically, allow managing and aggregating, in real time, multimedia contents coming from multiple sources, transforming them into a single video stream which can be displayed by means of any one streaming player (e.g. smartphones, televisions and tablets).

The multimedia contents that can be managed include: texts, xml html and json streams such as for example weather data and news, images, multimedia contents coming from the social networks (Facebook, Instagram), audio streams and video streams in general. The search engine analyzes the structured, semi-structured and unstructured contents coming from one or more of the abovementioned sources with the objective of extracting information which can regard the trace or the audio content being played, providing the user with a plurality of useful information that the latter may be able to personalize as he/she desires.

Secondly, such solution combines the possibility to create automated video schedules, typically managed by means of the classic digital signage platforms such as Xibo, Smart Display or Vision box, combining them with the possibility to convey the produced contents virtually on any device capable of transmitting a video stream streaming, without requiring additional components or the installation of software.

The main advantage that this new type of approach involves consists of automating the composition process, by means of the analysis of input, without having to use editing instruments. The entire system is centralized and agnostic towards the final players, allowing the creation of different types of scenarios with extreme ease, such as multicasts, wireless transmissions, mobile app.

The main hardware components to be managed are:

An audio stream reader module composed of at least a processor for analyzing the stream. This is adapted to extract the information from the input audio stream in the form of metadata, e.g. in ID3 format, even if multiple formats can be managed. Such metadata contains the most important information, i.e. regarding the type of audio content being broadcast (songs, news, advertisements or other). Such data is stored in an internal memory.

A data analysis module comprising at least a processor for analyzing the extracted metadata. This second module is also connected to the Internet by means of network interface hardware and collects additional information that is complementary to that extracted in the metadata, intelligently searching for it mainly on the Web, but in the presence of API or databases it can also manage these sources.

Said hardware modules execute programs specialized in the tasks that will be described below, rendering the analysis quick and real-time. This synergistic work, in addition to increasing and improving the distribution of the audio streams, makes the radio listener more comfortable/better served, so that he/she can be updated in real time regarding everything (news, social happenings, new songs, etc.). On such matter, this innovative system can have excellent application in the cellular telephone world, in particular this system has many functions with regard to the applications. Up to now, all the largest radio stations possess their own application that can be downloaded and installed on multiple operating systems, such as Android, iOS, Windows Mobile, etc. The installation of the software system on these would ensure a greater communication between the client and the radio itself, keeping the former updated in real-time regarding everything on the radio during the day. In such case, the software will be capable of sending push notifications to the user, such that he/she can daily participate in the radio programming of his/her preferred radio station, e.g. writing the user the name of the song that is being played at that precise moment, or warning the user to tune in as soon as possible since a game with prize giveaway will be starting soon, or even simply sharing news (weather, happenings, etc.). Moreover, since every single smartphone is characterized by an Internet connection, by now quite developed, the user may be able to share these notifications at any moment with all the social networks in his/her possession, so as to promote the diffusion of such application as much as possible. For those however who are unable to see the notification that arrived in time to make use of the same, they can still listen to the song or reproduce the stream that started the notification, since the application will be characterized by an internal memory that temporarily stores the audio and video streams that pass in a brief time period and enables the possibility to download them or activate the streaming even at a later time.

This invention has the object of increasing the interest of the users and of providing an additional stimulation for daily use, creating a more dynamic and interactive relationship.

It is important to note that such automation system, in addition to achieving brilliant objectives in the world of radio, is also applicable to television transmission, being perfectly integrated in broadcasting networks DVB-T/T2 (Digital Video Broadcasting-Terrestrial) or DVB-S/S2 (Digital Video Broadcasting-Satellite).

At this point of the description, we wish instead to give additional details regarding a possible method for implementing the software that is executed on the processor for researching additional information. Music, or in general all audio streams such as news or traffic information are encoded in digital data which comprises both the digital audio and a part of additional information on the transmitted stream, given in metadata form. A common format for audio file metadata is the ID3 format. In this format, various fields are defined that might be incomplete. For example, the name of the artist and the title of the song may be present, but the name of the album from which the song is taken might be missing, or there might not be a URL that leads to the artist's website. Said search software must supplement these missing fields and define other fields such as, by way of a non-limiting example, the links to the pages of the social profiles regarding the artist or the news or weather service supplier, the text of the songs being played, etc. Such search can start by extracting the data in text format from the metadata in ID3 format and completing a search on the web pages, cross-checking the results obtained by means of the various key words extractable from the metadata. In order to precisely obtain this data from web pages of heterogeneous type, a mix of web-scraping and automatic information extraction techniques can be used. The latter technique is particularly effective when an artificial intelligence model has been developed, based on machine learning techniques and natural language processing, since the texts of web pages are analyzed which are a type of data not readable by the machines as in the case of structured databases, but rather are of semi-structured type.

In the case of radio stations, it is of particular interest, in the field of the present invention, to have greater interaction with the user. By means of applications of mobile type or generally client software type executed on client devices, it is possible to collect information on the tastes of the user by collecting statistical data on the use and—upon permission granted by the user himself/herself—accessing information of the device or of the sensors such as, by way of a non-limiting example, time, data, GPS position. This allows developing directed advertising messages that are more relevant for the single user. According to the present invention, the product of the transmission is of both audio and video type; if market research deems it useful to be able to insert promotional messages in video format, the present system provides for the possibility to insert not just information strictly necessary for the user on screen but also advertising messages visible within the application, such as a variant of those of audio type typically transmitted by radio stations. An intelligent system installed on the client software of the user could detect if the screen is operating and automatically change between advertising of video type and that of audio type depending on the interaction of the user with the device, thus maximizing the contact between the promotional message and the user.

In order to obtain this type of targeting, recommendation algorithms for systems are used. The same recommendation algorithms can also be used for obtaining the musical songs to be recommended to the user based on the data collection upon use of the application.

In the present invention it is finally desired to have a variant of the client/user side application that accounts for different interaction requirements derived from use while driving. The characteristics of the system and method set forth up to now remain unchanged; there is however a different type of interaction with the user, which becomes nearly exclusively voice interaction. Hence, all the additional information that was collected by the intelligent search engine is presented on a screen (if the automobile on which the software is running has one) and on request of the user such information is also provided in audio message form. This requires the integration of the client device with at least a microphone and at least with voice recognition and voice synthesis engine.

Finally, it is desired to suggest a further application of the methods and of the systems set forth up to now by enriching the present invention with further possibilities for exploiting the data analysis algorithms and the interaction of the users described up to now. In particular, it is desired to consider the situation of a user inside a shop or a store or dining establishment. Frequently in these situations, the customer experience is enriched with background music adapted to render the shopping experience or in general consumption more satisfying. Even if the musical playlist is often decided ahead of time by the business manager, sometimes better expressing the identity of the brand, it is clear that a musical personalization would take under consideration the type of clientele present at every moment. The idea presented herein consists of installing, inside the establishment, a plurality of sensors, by way of a non-limiting example with Beacon technology. Such sensors are in short-distance wireless communication with a device of smartphone or tablet type. By means of this connection, the present method proposes collecting the music tastes according to the above-described methods and transmitting them —following approval, for privacy reasons, of the user—to the transmission system of the business. At this point, rather than transmitting a pre-established playlist, the business becomes aware of the music tastes of the clients present inside the establishment, or of most of the clients present therein, and thus adapts the playlist to their tastes, obtaining an experience that is undoubtedly improved for their clients.

The advantages offered by the present invention are clear in light of the description set forth up to now and will be even clearer due to the enclosed figures and to the relative detailed description.

DESCRIPTION OF THE FIGURES

The invention will be described hereinbelow in at least a preferred embodiment by way of a non-limiting example with the aid of the enclosed figures, in which.

DETAILED DESCRIPTION OF THE INVENTION

The present invention will now be illustrated as a merely non-limiting, non-constraining example, with reference to the figures which illustrate several embodiments related to the present inventive concept.

Figure 1:
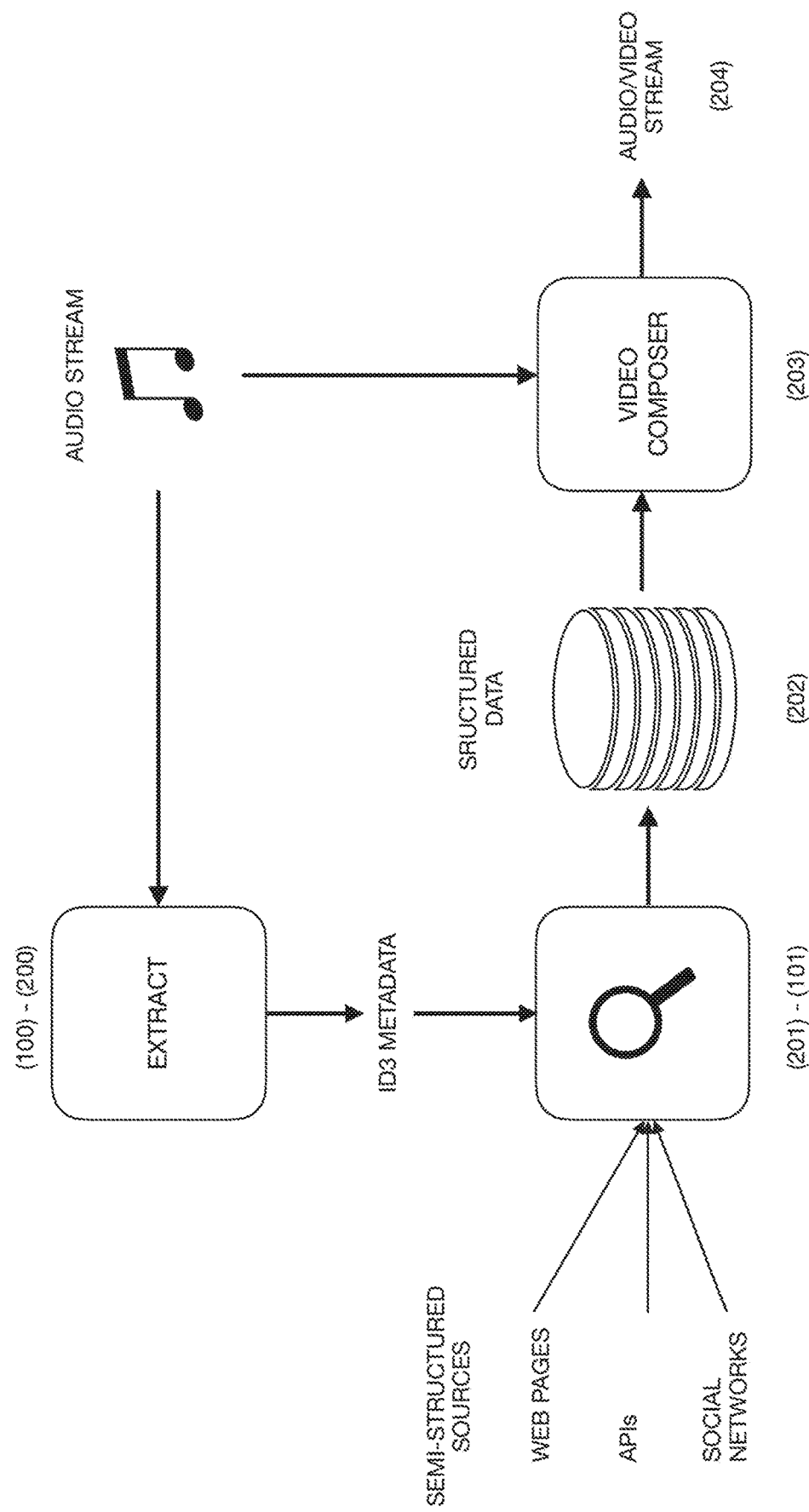
FIG. 1 shows the basic process for extracting the ID3 metadata by means of an extraction software 200 running on a processor 100, and such metadata is supplied to the advanced search engine 201 running on the processor 101 that searches the data coming from web pages, APIs, and social networks. It shows the database 202 in which the results of the search engine are stored and the video composer 203 which produces the final audio/visual stream.

With reference to FIG. 1, it is indicated that the initial process is adapted to extract, from an audio stream, the metadata in ID3 format. Said metadata is information regarding the audio transmission underway and can for example regard the name of the artist and the name of the song or album. Sometimes this information can be incomplete, or it is desired to provide the user not only with structured information on the song or on the audio stream in general but also with updates in real time regarding the artist, or the song itself, or updates on the traffic or weather. Such information is often not present in any structured database or in any case it is not collected in a single place. Nevertheless, it is present in the various web pages or posts on social networks, while a plurality of API are available for news and weather. The task of the search engine 201 is to understand the type of audio stream by reading the ID3 metadata, and to collect information as detailed and precise as possible from the unstructured sources described above. Such data is subsequently stored and structured in a single database from which a software of video composer type 203 extracts the data necessary for creating an audio/visual stream 204, in which the video is an automatic composition of the information collected by the search engine 201.

Figure 2:
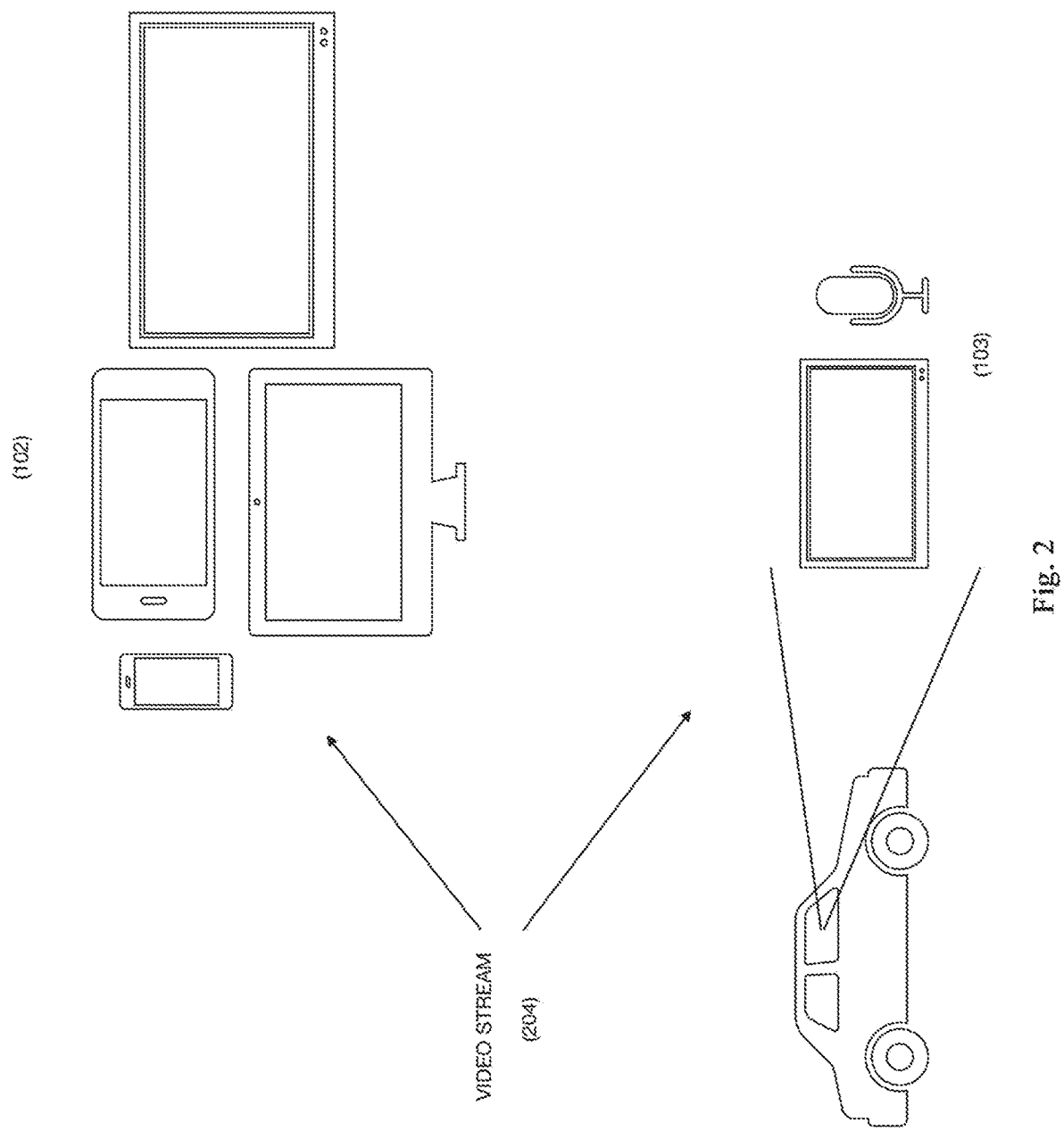
FIG. 2 illustrates how the audio/visual stream generated above is distributed on devices provided with screen 102 or devices mounted on automobiles 103.
Figure 3:
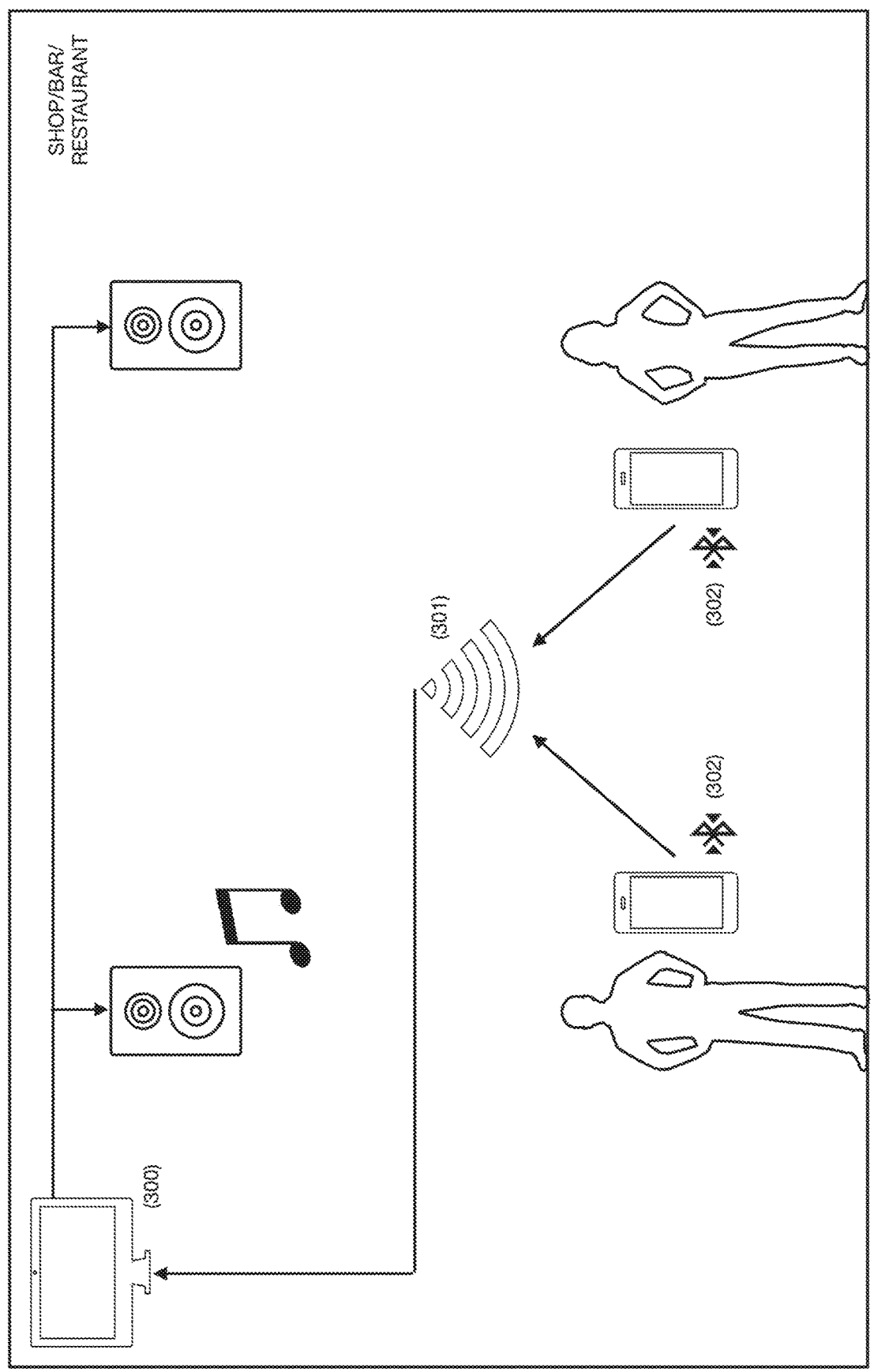
FIG. 3 shows an application of the invention in which the information collected by the interaction with said devices provided with screen is exploited in order to modify the musical transmission in a bar/restaurant space or shop provided with a suitable additional software 300 adapted to compose a playlist given the majority of preferences of the users. Said preferences are communicated to the software 300 by means of a sensor 301 which communicates with the devices of the users provided with suitable antenna 302.

Such audio/visual stream is transmitted, according to that illustrated in FIG. 2, to devices 102, 103 with streaming player installed, provided with screen for the video reproduction. Such stream can also be transmitted by broadcasting networks DVB-T/T2 and DVB-S/S2. The devices provided with screen and player streaming allow the user to interact with the audio/visual stream, expressing the preferences thereof on the reproduced contents. Such interactions are recorded and analyzed by recommendation systems adapted to create a profile of the user, based on which promotional messages will be personalized that will be transmitted to said devices 102, 103 both in audio format and in video format. The interaction, beyond the screen, can also be of voice type, as in the specific case of devices for drivers 103 in the figure. The user profiling data is particularly useful for the personalization of their experience. The present invention, with reference to FIG. 3, proposes a simple application of such personalization operation. In particular, from the figure, it is inferred that the clients of shops or bar/restaurant spaces equipped with a device with a client software installed that is adapted to reproduce the audio/visual stream 204 communicate by means of Bluetooth antenna with a Beacon, i.e. a proximity sensor. From such wireless communication, an additional software module 300 collects the most common preferences of the users present in the bar/restaurant space and thus produces a playlist personalized on such preferences. This system is in a clear improvement of the customer-experience relative to the bar/restaurant space or to the shop that implements the proposed solution.

Finally, it is clear that modifications, additions or variants that are obvious to the man skilled in the art can be made to the invention described up to now, without departing from the protective scope provided by the enclosed claims.

The invention claimed is:

1. A system for automatic enrichment of information for audio streams that automatically completes, in real time, multimedia contents from multiple sources, transforming the multimedia contents into a single audio/video stream viewable through a streaming player, and distributing said single audio/video stream on devices having a screen, said multimedia contents assembled together through a synergistic work between hardware and a non-transitory computer-readable medium on which is stored a computer program, said hardware comprising:

an audio stream reader module which initially extracts all metadata available in an associated audio file being played, the extracted metadata being ID3 metadata and being information regarding the audio stream being played;

a data analysis module that, through the extracted ID3 metadata and information contextual to reproduction of the audio stream, is adapted to process information necessary for production of the single audio/visual stream enriched with researched and aggregated data;

said computer program comprising instructions, which when executed by a computer, causes the computer to perform steps of:

starting from the ID3 metadata extracted from the audio stream being played and based on said information regarding the audio stream being played, searching in real time for additional information regarding the audio stream being played and reconstructing further metadata concerning the additional information by performing automatic searches for the additional information on each of the Web, Social Networks and other sources of unstructured data using an intelligent search engine;

storing the ID3 metadata extracted from the audio stream being played and the further metadata concerning the additional information found by said intelligent search engine to a single database; and using an audio/video composer, extracting data, including the additional information found by said intelligent search engine, from the single database and intregrating the audio stream being played with the extracted data from the single database into the single audio/video output stream enriched with the researched and aggregated data, wherein the extracted data comprises data necessary for creating the single audio/video output stream, in which the video of the single audio/video output stream is an automatic composition of the additional information collected by the search engine.

2. The system of claim 1, wherein the system is adapted to create automated video schedules adapted to generate a continuous reproduction of the single audio/video output stream; said video schedules being managed by platforms, combining them with each other, conveying the contents produced and avoiding the installation of additional components or the installation of software.

3. The system of claim 1, wherein the computer instructions are implemented in a smartphone application together with offline storage functions, sharing on social networks, notifications and audio/video reproduction.

4. The system of claim 1, wherein said intelligent search engine uses automatic information extraction methods based on machine learning methods and natural language processing for obtaining from websites data of artists of songs being streamed.

5. The system of claim 1, wherein the computer program further comprises instructions that cause the computer to transmit personalized audio promotional messages during intervals; said personalized promotional messages being created using recommendation algorithms which are based on data collected by user interaction with said system and by sensors and data present on the reproduction device.

6. The system of claim 1, wherein the computer program further comprises instructions that cause the computer to execute recommendation algorithms based on user feedback to recommend similar songs that the user can store and listen to on a streaming service, thus integrating for the user both preferences of the streaming service itself and further preferences developed while listening to music via radio.

7. The system of clam 5, wherein the computer program further comprises instructions that cause the computer to execute showing said promotional messages in graphic form on the display device instead of audio form, allowing the user to choose which mode to follow and activating audio mode automatically when the screen is not in operation for a given period of time.

8. The system of claim 1, wherein the computer program further comprises instructions that cause the computer to execute a step of interacting with the user in voice mode while driving for the communication of extra information with respect to the normal radio audio stream; said interaction being additional with respect to the video one and performed through application for devices mounted in cars.

9. The system of claim 1, further comprising a proximity sensor system comprising proximity sensors adapted to detect that the user is inside a shop, the computer program further comprising instructions that cause the computer to communicate to the shop's audio reproduction system the musical preferences common to or common to the majority of the users present and detected by means of a sensor so as to personalize the shopping experience with the music tastes of the customers; said function by requesting prior authorization for the sharing of data by the user.

10. The system of claim 2, wherein the computer instructions are implemented in a smartphone application together with offline storage functions, sharing on social networks, notifications and audio/video reproduction.

11. The system of claim 2, wherein said intelligent search engine uses automatic information extraction methods based on machine learning methods and natural language processing for obtaining from websites data of artists of songs being streamed.

12. The system of claim 3, wherein said intelligent search engine uses automatic information extraction methods based on machine learning methods and natural language processing for obtaining from websites data of artists of songs being streamed.

13. The system of claim 2, wherein the computer program further comprises instructions that cause the computer to transmit personalized audio promotional messages during intervals; said personalized promotional messages being created using recommendation algorithms which are based on data collected by user interaction with said system and by sensors and data present on the reproduction device.

14. The system of claim 3, wherein the computer program further comprises instructions that cause the computer to transmit personalized audio promotional messages during intervals; said personalized promotional messages being created using recommendation algorithms which are based on data collected by user interaction with said system and by sensors and data present on the reproduction device.

15. The system of claim 4, wherein the computer program further comprises instructions that cause the computer to transmit personalized audio promotional messages during intervals; said personalized promotional messages being created using recommendation algorithms which are based on data collected by user interaction with said system and by sensors and data present on the reproduction device.

16. The system of claim 2, wherein the computer program further comprises instructions that cause the computer to execute recommendation algorithms based on user feedback to recommend similar songs that the user can store and listen to on a streaming service, thus integrating for the user both preferences of the streaming service itself and further preferences developed while listening to music via radio.

17. The system of claim 3, wherein the computer program further comprises instructions that cause the computer to execute recommendation algorithms based on user feedback to recommend similar songs that the user can store and listen to on a streaming service, thus integrating for the user both preferences of the streaming service itself and further preferences developed while listening to music via radio.

18. The system of claim 4, wherein the computer program further comprises instructions that cause the computer to execute recommendation algorithms based on user feedback to recommend similar songs that the user can store and listen to on a streaming service, thus integrating for the user both preferences of the streaming service itself and further preferences developed while listening to music via radio.

19. The system of claim 5, wherein the computer program further comprises instructions that cause the computer to execute recommendation algorithms based on user feedback to recommend similar songs that the user can store and listen to on a streaming service, thus integrating for the user both preferences of the streaming service itself and further preferences developed while listening to music via radio.

20. The system of claim 2, wherein the computer program further comprises instructions that cause the computer to execute a step of interacting with the user in voice mode while driving for the communication of extra information with respect to the normal radio audio stream; said interaction being additional with respect to the video one and performed through application for devices mounted in cars.

\* \* \* \* \*